Patented Feb. 2, 1926.

1,571,648

UNITED STATES PATENT OFFICE.

ERWIN SCHMIDT, OF MANNHEIM-WALDHOF, GERMANY, ASSIGNOR TO THE FIRM GESELLSCHAFT FÜR CHEMISCHE PRODUKTION M. B. H., OF MANNHEIM-WALDHOF, GERMANY, A CORPORATION OF GERMANY.

PROCESS FOR OBTAINING HYDROCHLORIC ACID FREE FROM ARSENIC.

No Drawing. Application filed May 2, 1924. Serial No. 710,619.

*To all whom it may concern:*

Be it known that I, ERWIN SCHMIDT, a citizen of the German Republic, residing at Mannheim-Waldhof, in the Republic of Germany, have invented new and useful Improvements in a Process for Obtaining Hydrochloric Acid Free from Arsenic, of which the following is a specification.

Hitherto crude arsenic-containing hydrochloric acid was usually treated with sulphuretted hydrogen or barium sulphide, for the purpose of eliminating its arsenic.

It has been now discovered that it is easy to free completely crude arsenic-containing hydrochloric acid from its arsenic, whether the contents of the latter be relatively great or small, by treating it for a short time with activated charcoal. It has been found that charcoal manufactured by the process described in the U. S. Patent Ser. No. 1,358,162 November 9, 1920, of Knöpflmacher is particularly effective. If for instance arsenic-containing hydrochloric acid is shaken for a short time with a few per cent of the above charcoal from sulphite waste lye, and filtered, the filtrate will be found to be absolutely free from arsenic. At the same time the hydrochloric acid is also largely freed from iron which it generally contains, so that a practically colourless acid is obtained. The charcoal utilized can be easily regenerated in a well known manner, for instance by washing it with water and calcining again, the arsenious acid being volatilized.

What I claim is:

A process for making hydrochloric acid free from arsenic acid by bringing arsenic-containing hydrochloric acid into contact with activated charcoal.

In testimony whereof I have signed my name to this specification.

DR. ING. ERWIN SCHMIDT.